United States Patent [19]

Sharp et al.

[11] Patent Number: 5,304,093
[45] Date of Patent: Apr. 19, 1994

[54] METHOD AND APPARATUS FOR CONTROLLING A FLUID FLOW VALVE

[75] Inventors: Gordon P. Sharp, Newton; Rodney R. Stewart, Littleton; Alexander Dolgin, Lexington, all of Mass.

[73] Assignee: Phoenix Controls Corporation, Newton, Mass.

[21] Appl. No.: 822,088

[22] Filed: Jan. 17, 1992

[51] Int. Cl.⁵ .............................................. B08B 15/02
[52] U.S. Cl. ....................................................... 454/61
[58] Field of Search .............................. 454/49, 56, 61

[56] References Cited

U.S. PATENT DOCUMENTS

| | | | |
|---|---|---|---|
| 4,155,289 | 5/1979 | Garriss | 454/61 |
| 4,706,553 | 11/1987 | Sharp et al. | 454/61 |
| 4,741,257 | 5/1988 | Wiggin et al. | 454/56 |
| 5,092,227 | 3/1992 | Ahmed et al. | 454/61 |

OTHER PUBLICATIONS

Phoenix Controls Corporation Brochure, "FHS-300, Manifold Fume Hood Control System", Two Pages.

"Linear, Make Up Air Control Valve Specification", May 1987.
"Linear Exhaust Air Control Valve Specification", May 1987.
"MA-VVS Mark Air Valves", Mark Hot Inc. Air Distribution Equipment, Four Pages.
Mitco, A Division of Norwood Manufacturing Corporation, "Variable Air Volume by Mitco, The Simplest VAV Devices on the Market Today", Four Pages.
Phoenix Controls Corporation, "Venturi Valves", Brochure.

*Primary Examiner*—Harold Joyce
*Attorney, Agent, or Firm*—Wolf, Greenfield & Sacks

[57] ABSTRACT

A method and apparatus for controlling a fluid flow valve with a linear control loop such that the error signal utilized to actuate a variable rate controller for moving a valve control element or for controlling another valve control parameter is the same for a given control parameter change regardless of the current control parameter value or the current or desired fluid flow through the valve. A non-delayed indication of current fluid flow is also generated.

30 Claims, 5 Drawing Sheets

METHOD AND APPARATUS FOR CONTROLLING A FLUID FLOW VALVE

FIELD OF THE INVENTION

This invention relates to fluid flow valves and more particularly to a method and apparatus for the control of such valves.

BACKGROUND OF THE INVENTION

Figure 1:
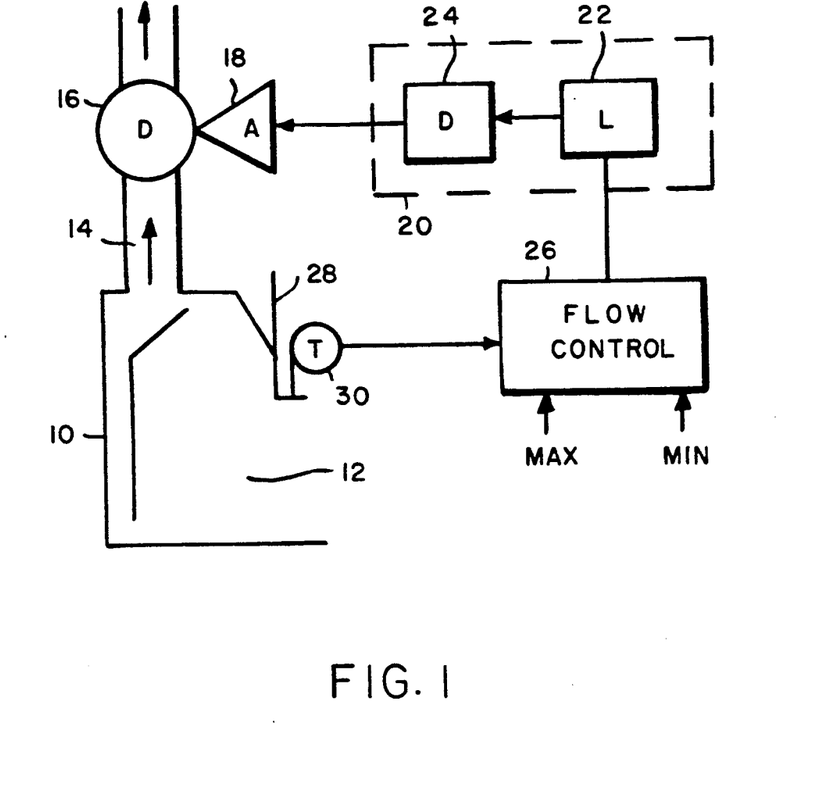
FIG. 1 is a schematic block diagram of a fume hood system in which the teachings of this invention may be utilized.

There are many applications where a valve is provided in a gas or liquid (collectively referred to as a "fluid") flow path to control the flow of the fluid. One such application is in the ducting of a fume hood where the valve may be in the form of a damper controlling the airflow through the hood. An example of such a system is shown in FIG. 1 and is described later. The fume hood system of FIG. 1 is also described in U.S. Pat. No. 4,706,553 entitled "Fume Hood Controller" issued Nov. 17, 1987.

In many prior art systems of this type, airflow through the valve or damper is monitored by an airflow sensor which may by a stand-alone device. A closed loop control is then provided to modulate the valve damper as required in response to outputs from the airflow sensor.

An inherent limitation on such systems is that they have a slow response time. This is because there is some time delay between a change in damper/valve position and the resulting change in airflow being sensed by the sensor. It also takes the sensor some time to sense the new airflow, convey such information to the control and for the control to then make an appropriate adjustment. Such devices are also subject to overshoot and undershoot errors which, as a minimum, increase response time in reaching a desired airflow and may result in a desired airflow not being achievable.

An improvement on such devices in appropriate applications is the use of a Venturi valve. In such valves, airflow is controlled by a cone shaped element positioned in and movable in the valve's orifice to vary the size of an annular-shaped fluid flow path formed in the orifice. Due to the shape of the cone and that of the orifice, the pressure drop across the valve's orifice can be measured by the force exerted on the cone by the difference between the static pressures directly in front of and behind the cone caused by the increased air velocity behind the cone. This effect is similar to the lift force created on a wing by the higher velocity and lower pressure appearing over the top of the wing. The Venturi valve uses this force to act upon a variable rate spring located inside the cone which connects the cone to the valve's shaft. The purpose of this spring is to provide a pressure compensating action such that, for a given position of the valve's shaft, the flow rate of the valve is constant or independent of pressure changes over some range of pressure drops across the valve (such as from 0.6" wc to 3.0" wc).

The result of the Venturi valve's cone and spring pressure compensating action is that there is a specific and fixed relationship or characteristic between the valve's shaft position and the fluid flow through the valve. To the extent that this characteristic is not predetermined for a given valve, it may be empirically determined for the valve in a given application by performing an initial calibration procedure. Once the characteristic is known, all that is required to achieve a desired airflow is to move the valve shaft to the appropriate position for such airflow. Thus, with such a valve, speed of response is limited only by the ability of control electronics to move the shaft to a new position. Accuracy is limited only by the accuracy of the calibration data, the accuracy of the control electronics and the effectiveness of the valve's variable rate spring and cone assembly in compensating for pressure differences. The elimination of the air flow feedback loop also eliminates the potential overshoot and undershoot problem of the prior approach.

Venturi valves of the type described above are currently controlled by comparing the actual flow, determined either by measurement or by operating on the valve shaft position with the valve characteristic, with a signal indicative of desired fluid flow and utilizing the resulting error signal to operate the valve actuator. The problem with such a control is that it is nonlinear, having a different gain for different fluid flows and valve shaft positions. However, since it is desirable for the valve to move quickly when it has large distances to travel so as to achieve rapid response time, while slowing down as the valve approaches the position for the desired flow so as to avoid overshoot, this nonlinearity makes it difficult to achieve the desired control characteristics for all shaft positions. In particular, if the response time is adjusted to avoid overshoot when the valve shaft moves for only a small distance to achieve a desired fluid flow change, the valve responds too slowly in regions where large shaft movements are required to achieve the same fluid flow change; while if the shaft speed is adjusted to achieve reasonable response time in the latter regions, overshoot occurs. Valve controls of this type therefore suffer from instability, less than optimal response time, and inherent overshoot and undershoot problems. Problems of this type may also exist in other types of valves having a control parameter other than shaft position controlling fluid flow.

Further, some valve systems of this type are currently digitally controlled, and may use a microprocessor. While digital control offers enhanced flexibility of design, digital circuits are also more complicated to design, to install and to maintain, particularly for relatively unsophisticated electricians. Further, a digital or microprocessor controlled system is normally slightly slower than a comparable analog system which may result in variation or errors in the length of modulating pulses to, for example, a pneumatic valve controller used for the valve. Such variations are another potential cause of overshoot or undershoot in valve control.

Finally, it is desirable to have an indication of actual fluid flow in some applications of such valves which may be used as a feedback signal for certain system control functions. However, as indicated above, a sensor in the flow path has an inherent time delay. A means for providing such a feedback indication which is not time delayed is therefore required.

It is therefore an object of this invention to provide for the linear control of valve position, and in particular, for the control of a Venturi-type valve, so that optimum control rates may be selected for repositioning of the valve shaft which rates are appropriate regardless of current or final shaft position. More particularly, it is an object of this invention to permit the valve shaft to be moved at a higher rate when the valve shaft has greater distances to travel, thus optimizing valve response time, while permitting the rate of travel of the valve shaft to be slowed when the valve is near its desired end position so as to avoid overshoot or undershoot problems and avoid potential instability. Another object of this invention is to provide a simple analog implementation for achieving the above objects. Finally, it is an object of this invention to provide a non delayed indication of current fluid flow which may be utilized for feedback or other system functions.

SUMMARY OF THE INVENTION

In accordance with the above, this invention provides a method and apparatus for controlling a fluid flow valve of the type having a movable element or other control parameter, there being a predetermined control parameter/fluid flow characteristic for the valve. In the control, a first signal is generated which is indicative of actual control parameter value (for example, element position), and a second signal is received from an appropriate source, which signal is indicative of desired fluid flow. The control parameter is then varied in a selected direction and at a selected rate in response to a control input. For example, the element, which could for example be the shaft of the Venturi valve, is moved to either increase or decrease the size of the annular valve aperture at a controlled rate which may be varied. A control loop or circuit is provided for generating the control input in response to the first and second signals. The control circuit includes a circuit or other means for generating a signal indicative of the difference between the actual parameter value and the parameter value required to achieve the desired fluid flow, with the control input being generated in response to such different signal. The control input has at least two different magnitudes for varying the control parameter at different rates, depending on the value of the difference signal.

In order to further facilitate system control, an output signal is also generated which is indicative of actual fluid flow. This actual fluid flow signal may be achieved for a preferred embodiment by operating on the first signal with the valve characteristic. The control input may vary as a substantially continuous function of the difference signal or at least one threshold for difference signals may be established with the magnitude of the control input changing as a difference signal passes through each threshold. For some embodiments, particularly a digital embodiment (which may employ a microprocessor), the second signal may be operated on with the inverse of the valve characteristic to obtain a signal indicative of parameter value (for example, element position) for the desired fluid flow, with the difference signal being the difference between the first signal and the signal resulting from the operation on the second signal.

For embodiments where the valve is a Venturi valve or other valve having a characteristic such that the percentage change in fluid flow for a given distance movement of the valve shaft or other parameter change is substantially constant regardless of fluid flow and element position, the control signal generating circuit may operate on the first signal with the valve characteristic to obtain a third signal indicative of actual fluid flow. A fourth signal is then generated which is indicative of the difference between the second and third signals and this fourth signal is divided by one of the second or the third signals to obtain the desired difference signal. Generally, the position characteristic of the valve for such embodiments is a logarithmic characteristic of flow.

For a preferred analog implementation, rather than performing actual division on the fourth signal, selected thresholds are established for the ratio of the fourth signal to the second or third signal, with outputs being generated when these ratios are achieved.

The foregoing and other objects, features and advantages of the invention will be apparent from the following more particular description of preferred embodiments of the invention as illustrated in the accompanying drawings.

DETAILED DESCRIPTION

Referring first to FIG. 1, a fume hood system 10 is shown with a fume hood 12 being exhausted through duct 14 under control of damper 16. The position of damper 16 is controlled by an actuator 18 which is in turn controlled by a controller circuit 20. Control circuit 20 consists of a linearizing device 22 and a driver 24. Linearizing device 22 compensates for the nonlinear characteristic of damper 16. A flow control device 26 generates an output to control circuit 20. A number of factors may influence control circuit 26 including the position of fume hood sash 28 as determined by a transducer 30. The fume hood system shown in FIG. 1 is also shown in FIG. 16 of the before-mentioned U.S. Pat. No. 4,706,553 and is described in greater detail in conjunction with such patent. The current invention is concerned primarily with the control circuit 20 and may differ in some respects from the device shown in FIG. 1, which differences are discussed later.

Figure 2:
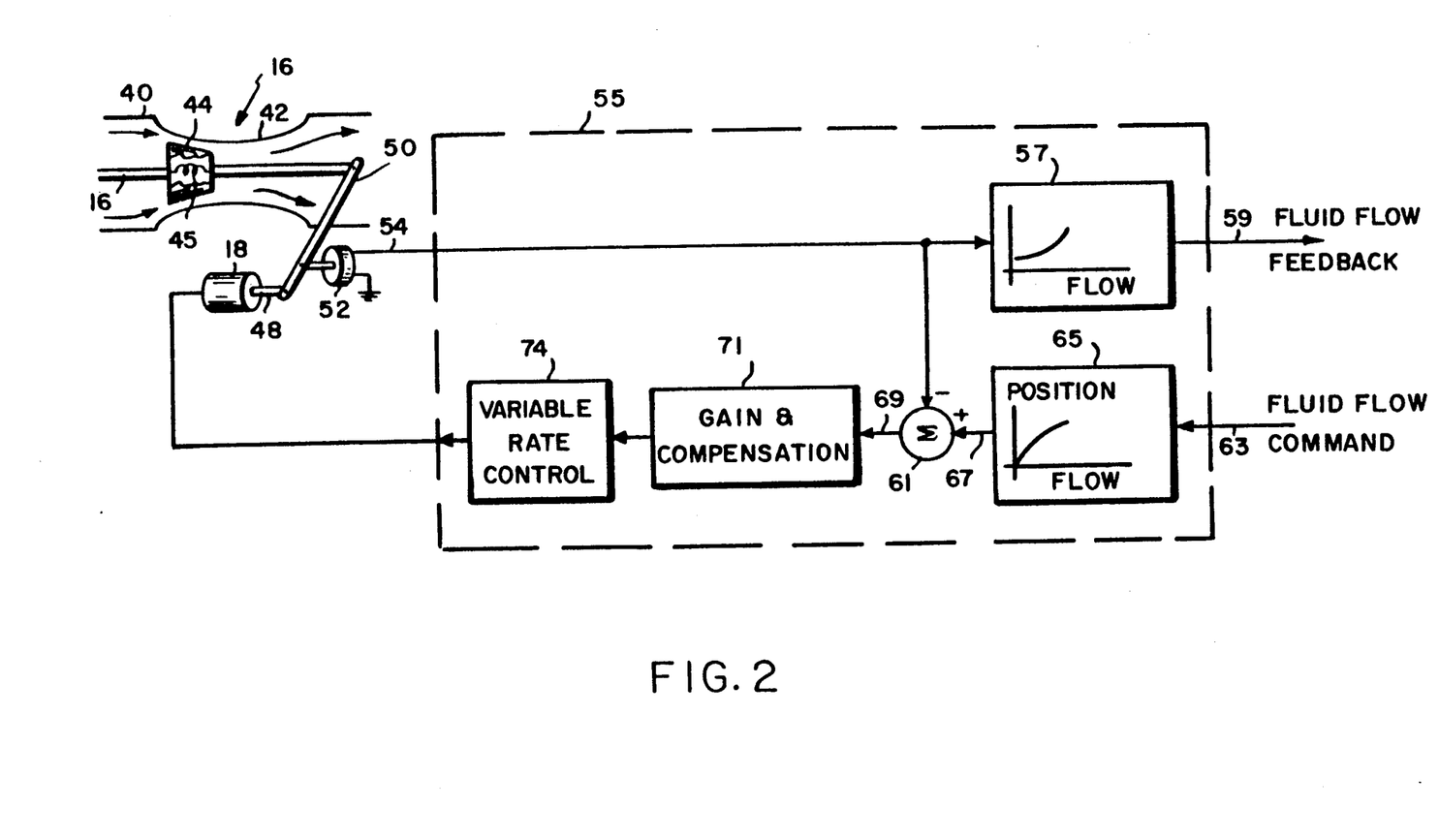
FIG. 2 is a schematic block diagram of a valve and controller in accordance with a first embodiment of the invention.

Referring now to FIG. 2, a valve and control circuit in accordance with the teaching of this invention are shown. In particular, valve 16 has a housing 40 with a reduced diameter portion 42. A cone 44 is mounted in housing 40 and is supported by a pressure differential compensating spring 45 on a shaft 46 to be moved laterally in and out of reduced diameter section 42. The further cone 44 is moved into area 42, the more the cone reduces air flow. As was previously discussed, spring 45 is a variable rate spring which provides a pressure compensating action so that, for a given position of the valve shaft, the flow rate is constant independent of pressure changes across the valve over a selected pressure range. Thus, the characteristic of shaft position to air flow through valve 16 is predictable and calibratable. In particular, this characteristic has been found to be generally logarithmic for a valve of the type shown in FIG. 2 which valve is normally referred to as a Venturi valve.

Actuator 18 may be an electric or a pneumatic actuator. Piston 48 of the actuator bears against one end of a pivot arm 50, the other end of which is attached to valve shaft 46. Thus, depending on the location of the pivot point for pivot arm 50, movement of actuator piston 48 causes a corresponding movement of shaft 46 and cone 44 either in the same or opposite direction as the movement of piston 48.

A potentiometer 52 connected between ground and a positive voltage has its wiper arm connected to pivot arm 50. As a result, the voltage on output line 54 from the potentiometer is proportional or directly related to the lateral position of shaft 46 in valve 16.

The signal on line 54 is applied to a control circuit 55 which may be a microprocessor or other computer or may be made up of discrete digital or analog components. Thus, while for purposes of illustration, discrete components are shown within circuit 55, which components may be either analog or digital, it is to be understood that the functions of the various components of circuit 55 could be performed by a suitably programmed processor. In particular, the signal on line 54 is applied as an input to a transform or linearization circuit 57 which operates on the signal with the valve characteristic. Since the signal on line 54 is indicative of shaft position, transforming this signal with the valve characteristic results in a signal on fluid flow feedback line 59 which is indicative of the actual fluid flow through valve 16. This fluid flow feedback signal may be applied to other control circuitry in the system to perform various control functions.

The signal on line 54 is also applied as one input, and in particular as the negative input, to a summing circuit 61. A signal indicative of desired fluid flow is applied to circuit 55 on line 63, this signal, for example, being obtained from fluid flow control 26 (FIG. 1). The signal on line 63 is operated on with the inverse of the valve characteristic in a circuit 65. This results in an output on line 67 which is indicative of the shaft position required to achieve the desired fluid flow. The signal on line 67 is applied as the positive input to summer 61.

Summer 61 thus subtracts the actual shaft position from the desired shaft position, generating an error output on line 69 the sign of which indicates the direction in which valve shaft 46 must be moved and the magnitude of which indicates the distance which shaft 46 must be moved in order to achieve the desired fluid flow. The signal on line 69 is applied through gain and compensation circuit 71 to a variable rate control circuit 74. Gain and compensation circuit 71 amplifies the signal on line 69 and compensates for any gain variations which may occur in the circuit with frequency or other variables. Variable rate control 74 may be either an electrical or a pneumatic circuit depending on the nature of actuator 18. Thus, if actuator 18 is a solenoid or other electrical actuator, variable rate control 74 generates an output on line 75 which is an electrical signal the polarity of which may vary with the desired direction of shaft movement and the magnitude of which varies with the rate at which it is desired for the shaft to be moved. Variable rate control 74 may be continuously variable so that the rate at which shaft 46 is moved continues to decrease as the shaft approaches the required position for the desired fluid flow, or variable rate control 74 may have one or more thresholds with the value on line 75 being maximum when the error signal applied is above a given threshold, decreasing to a lower level when the error signal (and thus the required distance which the shaft must travel) falls below the threshold and terminating or going to a steady state condition when the error signal drops below a second threshold indicating that shaft 46 has reached the desired position within a predetermined tolerance. Additional intermediate thresholds may also be provided. This variable rate control assures that a desired shaft position is achieved without undershoot and with overshoot which does not exceed the positioning error criteria. Similarly, where actuator 18 is a pneumatic actuator, variable rate control 74 could contain a pneumatic control solenoid for each direction of shaft movement, with the appropriate solenoid being activated in response to the polarity of the error signal and the valve duty cycle being modulated in response to the magnitude of the error signal.

With either type of actuator, since the error signal is always a linear function of the distance which the valve shaft must travel to achieve the desired fluid flow regardless of actual valve position and fluid flow, variable rate control 74 may cause the valve shaft to move at a relatively high speed when the shaft has a substantial distance to travel, thus optimizing the response time of the valve, while reducing the speed of the valve as it approaches the desired end position, thus eliminating undershoot and overshoot errors. A substantially improved valve controller is thus obtained.

Figure 3:
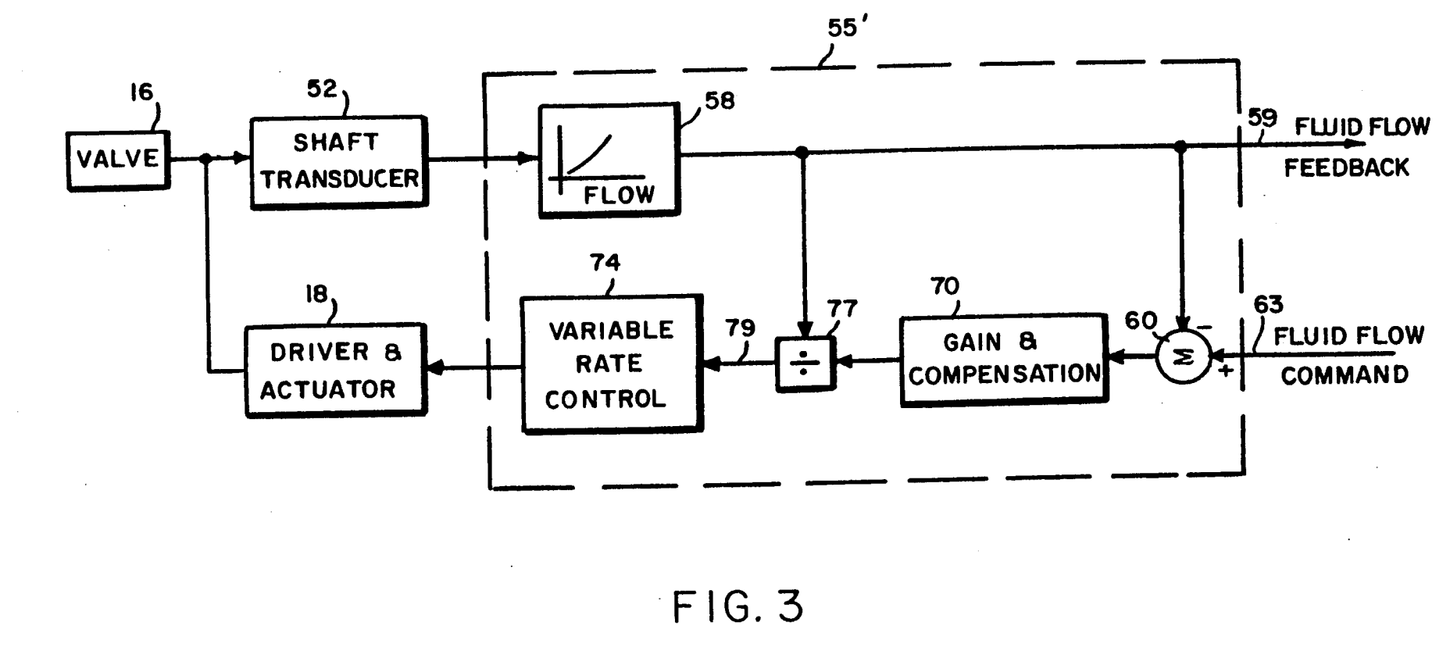
FIG. 3 is a schematic block diagram of a valve and controller in accordance with a second embodiment of the invention.

FIG. 3 illustrates an alternative embodiment of the invention which may be utilized in a specialized situation where the valve utilized has a logarithmic characteristic or another valve characteristic wherein the percentage change in fluid flow for a given distance movement of the valve shaft is substantially constant regardless of fluid flow and valve shaft position. In this circuit, the output from shaft transducer 52 is applied to a circuit 55' which may again be either a programmed microprocessor or may be formed of discrete digital or analog components. More particularly, the output from the shaft transducer on line 54 is applied to a transform or linearization circuit 58 which operates on the shaft transducer signal with the valve characteristic. The resultant output signal on line 59 may be utilized as the fluid flow feedback signal. This signal is also applied as one input to summing circuit 60, and in particular, as a negative input to this circuit, and as the denominator input to division circuit 77. The positive input to summing circuit 60 is the fluid flow command on line 63. The output from summing circuit 60 is applied through a gain and compensation circuit 70 which performs the same functions as gain and compensation circuit 71, to the numerator input of division circuit 77. Gain and compensation circuit 70 may be positioned on either side of divider 77, the circuit being positioned on the input side of divider 77 for purposes of illustration only. Further, while the denominator input to circuit 77 is a signal on line 59 indicative of actual fluid flow, the denominator input to circuit 77 could also be the signal on line 63 indicative of desired fluid flow.

The output from circuit 77 on line 79 is a ratio of the fluid flow error to either actual or desired fluid flow. However, because of the special nature of the valve characteristic, this ratio or percent is substantially constant for a given required shaft position change regardless of valve shaft position and is equivalent to the signal on line 69 in FIG. 2. The signal on line 79 is applied to a variable rate control 74 which performs the same functions as the variable rate control 74 of FIG. 2, the output from control 74 being applied to control driver and actuator 18.

The circuit of FIG. 3 thus operates in substantially the same way and enjoys the same advantages as the circuit of FIG. 2; however, the circuit of FIG. 3 is preferably where the valve characteristic permits its use and where a fluid flow feedback signal is desired in that it requires only a single transform circuit 58 rather than two transformer circuits as for the circuit of FIG. 2. A transform circuit is a more expensive and complicated device than divider 77.

Figure 4:
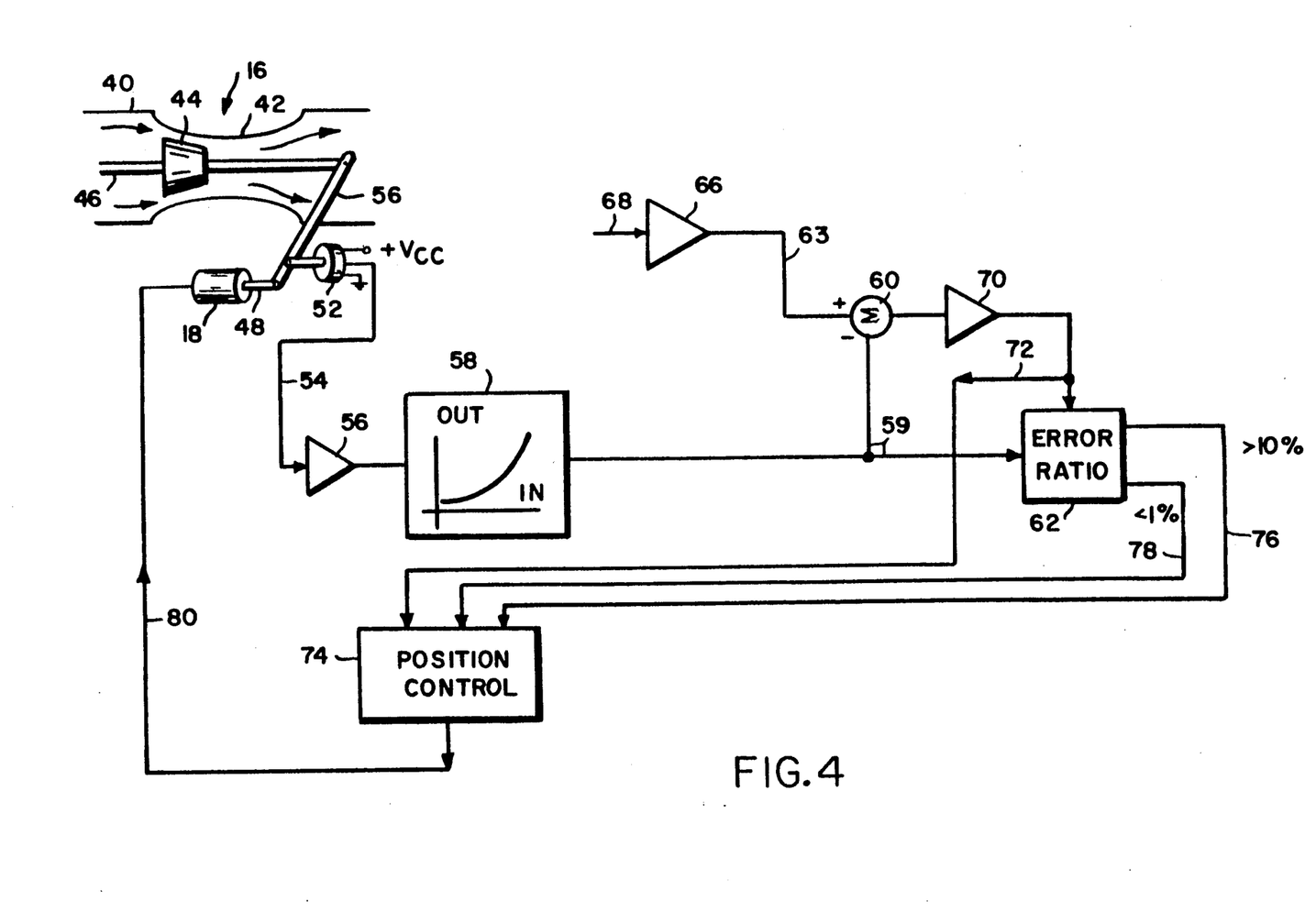
FIG. 4 is a schematic block diagram of a valve and controller in accordance with a particular implementation of the embodiment shown in FIG. 3.

FIG. 4 shows a simple analog circuit implementation of the embodiment of FIG. 3. In the embodiment of FIG. 4, it is assumed that all of the various components shown are discrete analog components, although their embodiment could, if desired, be implemented with digital components. As with the circuit of FIG. 3, the inputs to summing circuit 60 are output line 59 from transform or linearization circuit 58 and the fluid flow command line 63 which is shown in FIG. 4 as being the output from a buffer 66 receiving a control voltage indicative of desired fluid flow on line 68. The output from summing circuit 60 is applied to a position error amplifier 70 which may be the same as gain and compensation circuit 70 of FIG. 3. Output line 72 from amplifier 70 is applied as one input to error ratio calculation circuit 62, the other input to this circuit being the output line 59 from linearization or transform circuit 58.

Circuit 62 determines the ratio of the input on line 72 to the input on either line 59 or line 63. In other words, circuit 2 determines the ratio of the distance valve shaft 46 must be moved to either the current or desired position of the valve shaft. If this difference is greater than 10%, meaning that the shaft has a long way to move, circuit 62 generates an output signal on line 76. If the ratio computed by circuit 62 is less than 1%, meaning that shaft 46 has arrived at the desired position within a 1% tolerance, circuit 62 generates an output signal on line 78 The ratio at which an output is generated on line 76 may vary with application and is selected to permit the valve shaft and cone 44 affixed thereto to move at maximum speed until getting near the desired final position, and then to slow down as they move through the final portion of their travel path so that they may be brought to a smooth stop without overshoot. Ten percent has been found to be a suitable point at which to effect this transition for a preferred embodiment, but other values may be found to be more suitable in other applications or embodiments.

Similarly, 1% is the target accuracy for the valve control for the preferred embodiment. Thus, when the error signal on line 72 is within 1% of the current or target position, the shaft and cone are considered to be properly positioned so that movement of the shaft and cone are terminated. For systems having a different target accuracy, the output on line 78 would appear for a ratio reflecting the selected target accuracy.

The signals on lines 76 and 78 are two inputs to position controller 74, the final input to this circuit being the error signal on line 72. Controller 74 is for this embodiment a pneumatic control having a pneumatic output line 80 which is connected to apply a selected pneumatic pressure to pneumatic actuator 18. In a preferred embodiment, controller 74 may have two pneumatic solenoid values, one for each direction in which shaft 46 may be moved to either supply or bleed pneumatic air from the actuator 18. The sign of the signal on line 72 determines which one of the pneumatic solenoids is to open. The signals on lines 76 and 78 determine the duty cycle for the selected solenoid. In particular, when a signal appears on line 76, the selected pneumatic solenoid is preferably opened continuously. Alternatively, the solenoid may be modulated so as to be opened for a relatively large portion of its duty cycle When there is no signal on either line 76 or 78, the selected solenoid is modulated so as to be open for a selected portion of its duty cycle.

Furthermore, in the preferred embodiment, it is advantageous to vary the duty cycle in this region so that the solenoid has a duty cycle that becomes smaller as the distance remaining to be traveled becomes less. This variation in duty cycle could be made linear respect to the variation in remaining distance to be traveled. However, it has been found advantageous to use an exponential function instead which more gently decreases the effective shaft deceleration rate, or rate at which the duty cycle is being decreased, as the final shaft position is approached, in order to better prevent any occurrence of overshoot.

For the alternative embodiment, this would be shorter than the duty cycle with a signal on line 76. When a signal appears on line 78, the selected solenoid is closed, stabilizing the pressure on line 80 and thus terminating further movement of actuator 18. This results in shaft 46 remaining in its existing position. Since the shaft is moving at relatively low speed at this point, it may be stopped with substantially no overshoot (i.e., with any overshoot being less than the target accuracy).

The major advantage of the circuit shown in FIG. 4 over that shown in FIG. 3, particularly for an implementation using discrete analog components, is that analog dividers are relatively complex devices and error ratio calculator 62 may be a much simpler and less expensive device. As with the embodiment of FIG. 3, a major advantage of the circuit shown in FIG. 4 is that, with valve 16 having a logarithmic shaft position/airflow characteristic, the linear movement of shaft 46 required to effect a given percentage change in airflow is constant regardless of airflow and shaft position. This permits the rate at which the shaft is moved to be the same for a given percentage change in airflow regardless of position without risking overshoot or undershoot.

Figure 5:
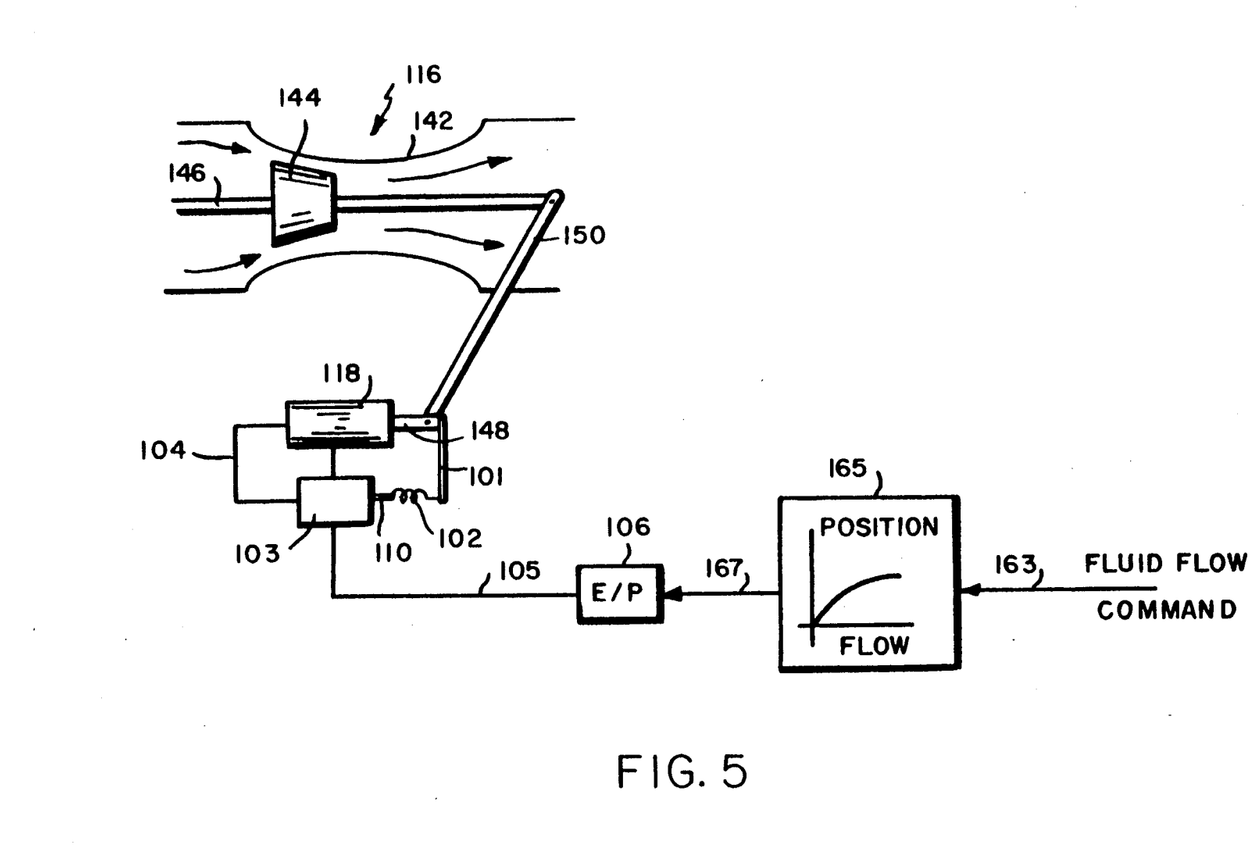
FIG. 5 is a schematic block diagram of a prior art valve and controller.

FIG. 5 depicts a prior art implementation that does not have an indication of fluid flow or valve shaft position. In the implementation, the valve shaft 146 of venturi valve 116 is connected to pivot arm 150 which is, in turn, attached to the shaft 148 of actuator 118. The control of actuator 118 is performed by the combination of elements 103, 106, and 165. Fluid flow command 163 is converted to an appropriate valve shaft position command signal 167 by the linearization network 165 which contains the inverse of the valve characteristics. The 0–1 volt electronic shaft position command is converted to a pneumatic 3–15 psi shaft position command signal 105 by the electronic to pneumatic transducer 106. Pneumatic position command signal 105 is used to command the actuator 118 through the use of pneumatic pilot positioner 103. This basic and common pneumatic component consists of a pneumatically operated position control loop that is used to provide greater position accuracy to the function of a pneumatic actuator. It consists of a connecting bar 101 which is connected to the actuator shaft 148, a linear spring 102 is connected to the connecting bar 101, and also a chain or mechanical arm 110 connected to a diaphragm located inside pilot position 103. As the actuator shaft 148 moves back and forth, spring 102 is, in turn, shortened and extended, varying the amount of spring tension applied to the diaphragm inside pilot positioner 103. This diaphragm pneumatically amplifies this force or pressure, compares it to the position command pressure and amplifies the difference. The amplified difference pressure 104 is then used to command the actuator 118. The pilot positioner thus provides closed loop position control of the actuator shaft postitioner 148 with respect to position command 105. The disadvantage of this prior art device, however, is that it includes no method for determining or indicating the actual position of either the valve shaft position 146 or even the actuator shaft position 148.

Due to the operation of the pilot positioner component, no external electronic or pneumatic signal is generated that is indicative of these positions. Instead, the pilot positioner internally converts the actuator position 148 to a spring force and diaphragm pressure that cannot be obtained or accessed internally. This aspect of these devices is inherent in their construction and thus prevents this prior art implementation from generating an output signal indicative of the valve's flow.

A simple linear fluid flow valve controller is thus provided. While for the preferred embodiment, a Venturi valve having a logarithmic shaft position/airflow characteristic has been shown, other fluid flow valves having characteristics which result in a substantially constant movement of the valve element, for example shaft 46 and cone 44, for a given percentage error regardless of element position and fluid flow could also be utilized. With the embodiment of FIG. 2, this limitation of valve characteristic does not exist. The only limitations on valve characteristic for any of the embodiments are that the characteristic be a single valued non step function which, at least for some hood applications, is independent of pressure variation across the valve within the normal operating range of the valve.

In addition, for valves which control fluid flow by use of a control parameter other than a movable shaft and/or cone, the teachings of this invention could be utilized so long as the valve has a characteristic for the control parameter/fluid flow which satisfies the criteria previously stated. Further, while valve 16 for the preferred embodiment is being used as an airflow valve in a fume hood, the teachings of this invention could also be utilized in other applications where a valve is being utilized to control either gas or liquid flow. Variations may also be made in other specific components utilized such as, for example, the shaft transducer which may, for example, be a standard optical, magnetic or other position sensing device. Thus, while the invention has been particularly shown and described above with respect to a preferred embodiment, the foregoing and other changes in form and detail may be made therein by one skilled in the art without departing from the spirit and scope of the invention.

What is claimed is:

1. A controller for a fluid flow valve, the valve having a control parameter and having a predetermined single-valued control parameter/fluid flow characteristic, the controller comprising:
   means for generating a first signal indicative of actual value of the control parameter;
   means for receiving a second signal indicative of desired fluid flow;
   means for varying the value of the control parameter in a selected direction at a selected rate in response to a control input; and
   loop means responsive to said first and second signals for generating said control input, said loop means including means for generating a signal indicative of the difference between the actual control parameter value and the control parameter value required to achieve the desired fluid flow, and means responsive to said difference signal for generating the control input, said control input having at least two different magnitudes for varying the control parameter at different rates dependent on the value of the difference signal.

2. A controller as claimed in claim 1 wherein said control parameter is the position of a movable element.

3. A controller as claimed in claim 2 including means for generating an output signal indicative of actual fluid flow.

4. A controller as claimed in claim 3 wherein the fluid flow output signal generating means includes means for operating on the first signal with the valve characteristic.

5. A controller as claimed in claim 2 wherein the means for generating the control input includes means for generating a control input which varies as a substantially continuous function of said difference signal.

6. A controller as claimed in claim 2 wherein said means for generating the control input includes means for establishing at least one threshold for the difference signal, and means responsive to the difference signal passing through said threshold for changing the magnitude of said control input.

7. A controller as claimed in claim 2 wherein said loop means includes means for operating on said second signal with the inverse of said valve characteristic to obtain a third signal indicative of element position for the desired fluid flow, said means for generating a difference signal including means for determining the difference between said first signal and said third signal.

8. A controller as claimed in claim 2 wherein said valve characteristic is such that the percentage change in fluid flow for a given distance movement of the element is substantially constant regardless of fluid flow and element position and wherein said loop means includes means for operating on said first signal with the valve characteristic to obtain a third signal indicative of actual fluid flow, wherein said difference signal generating means includes means for generating a fourth signal indicative of the difference between the second and third signals, and means for dividing the fourth signal by one of the second or third signals to obtain said difference signal.

9. A controller as claimed in claim 8 wherein said means for dividing divides the fourth signal by the third signal.

10. A controller as claimed in claim 8 wherein said valve characteristic is a logarithmic characteristic of flow.

11. A controller as claimed in claim 8 wherein said first and second signals are analog signals and wherein said loop means is an analog circuit.

12. A controller as claimed in claim 2 wherein said loop means is a digital circuit.

13. A controller as claimed in claim 12 and wherein said loop means includes means for operating on said second signal with the inverse of said valve characteristic to obtain a third signal indicative of element position for the desired fluid flow, said means for generating a difference signal including means for determining the difference between said first signal and said third signal.

14. A controller as claimed in claim 2 wherein said valve is a Venturi valve having a substantially logarithmic characteristic of flow.

15. A controller as claimed in claim 2 wherein said fluid is air and wherein said valve is a flow control damper for a fume hood.

16. A controller for a fluid flow valve, the valve having a movable element and having a characteristic such that the percentage change in fluid flow for a given distance movement of the element is substantially constant regardless of the fluid flow and element positions, the controller comprising:
   means for generating a first signal indicative of element position;
   means for generating a second signal indicative of a desired fluid flow;
   means for linearizing said first signal by operating on it with the valve characteristic;
   means for generating an error signal proportional to the difference between the second signal and the linearized first signal;
   means for determining the ratio of the error signal and at least one of the linearized first signal and the second signal, said means including means for generating at least one output the value of which varies as a function of the determined ratio;
   and means for moving said element at one of at least two different rates in response to the value of said output signal.

17. A controller as claimed in claim 16 wherein the valve characteristic is a logarithmic characteristic of flow.

18. A controller as claimed in claim 16 wherein said means for generating a first signal includes a variable resistance, the resistance value of which varies as a function of element position.

19. A controller as claimed in claim 16 wherein said ratio determining means includes means for providing a first output value if the ratio exceeds a first selected ratio and for not providing the first value if the ratio is less than the first selected ratio.

20. A controller as claimed in claim 19 wherein said ratio determining means includes means for providing a second output value if the ratio falls below a second selected ratio and for not providing the second output value if the ratio is greater than the second selected ratio.

21. A controller as claimed in claim 20 wherein said means for moving moves the element at a higher rate when said first output value is provided and at a lower rate when said first output value is not provided.

22. A controller as claimed in claim 20 wherein said means for moving moves the element at a selected rate when the error signal is present and the second output value is not provided, and stops moving the element when the second output value is provided.

23. A controller as claimed in claim 20 wherein said means for moving moves the element at a selected rate when the error signal is present and the second output value is not provided, and stops moving the element when the second output value is provided; and wherein said means for moving the element includes a pneumatic actuator, and means for controlling the pneumatic pressure applied to said actuator in response to the presence and absence of said first and second output values.

24. A controller as claimed in claim 23 wherein said means for controlling includes a pneumatic solenoid for each direction in which said element may be moved, and means for modulating the operations of said solenoids in response to the presence and absence of said first and second output values.

25. A controller as claimed in claim 16 wherein said ratio determining means includes means for providing a second output value if the ratio falls below a second selected ratio and for not providing the second output value if the ratio is greater than the second selected ratio, and wherein said means for moving moves the element at a selected rate when the error signal is present and the second output value is not provided, and stops moving the element when the second output value is provided.

26. A method for controlling a fluid flow valve, the valve having a control parameter and having a predetermined single-valued control/parameter fluid flow characteristic, the method comprising the steps of:
   generating a first signal indicative of the actual value of the control parameter;
   receiving a second signal indicative of desired fluid flow;
   varying the value of the control parameter in a selected direction at a selected rate in response to a control input; and
   responding to said first and second signals for generating said control input, said step including the steps of generating a signal indicative of the difference between the actual control parameter value and the control parameter value required to achieve the desired fluid flow, and responding to said difference signal for generating the control input, said control input having at least two different magnitudes for varying the control parameter at different rates dependent on the value of the difference signal.

27. A method as claimed in claim 26 wherein said control parameter is the position of a movable element.

28. A method as claimed in claim 26 including the step of generating an output signal indicative of actual fluid flow.

29. A method as claimed in claim 26 wherein said valve characteristic is such that the percentage change in fluid flow for a given distance movement of the element is substantially constant regardless of fluid flow and element position; wherein said responding step includes the steps of operating on said first signal with the valve characteristic to obtain a third signal indicative of actual fluid flow, and wherein said difference signal generating step includes the steps of generating a fourth signal indicative of the difference between the second and third signals, and dividing the fourth signal by one of the second or third signals to obtain said difference signal.

30. A controller as claimed in claim 16 including means for generating a second output signal indicative of actual fluid flow.

* * * * *